(12) United States Patent
Eby

(10) Patent No.: US 7,007,366 B1
(45) Date of Patent: Mar. 7, 2006

(54) METHOD FOR INSTALLING A FOLDAWAY HAND RAIL TO A VEHICLE

(75) Inventor: Darren Eby, Bristol, IN (US)

(73) Assignee: ASC Industries, Inc., Elkhart, IN (US)

( * ) Notice: Subject to any disclaimer, the term of this patent is extended or adjusted under 35 U.S.C. 154(b) by 0 days.

(21) Appl. No.: 10/620,831

(22) Filed: Jul. 16, 2003

Related U.S. Application Data

(60) Provisional application No. 60/404,093, filed on Aug. 16, 2002.

(51) Int. Cl.
*B23P 11/00* (2006.01)

(52) U.S. Cl. .................. 29/436; 29/434; 29/525.02

(58) Field of Classification Search ............... 29/434, 29/436, 525.01, 525.02
See application file for complete search history.

(56) References Cited

U.S. PATENT DOCUMENTS

| | | | |
|---|---|---|---|
| 1,179,286 A | 4/1916 | Crimmel | |
| 1,435,110 A | 11/1922 | Efford | |
| 1,796,344 A | 3/1931 | Pleiss | |
| 2,411,448 A | 11/1946 | McLean | 248/289 |
| 2,437,647 A | 3/1948 | McLean | 248/289 |
| 3,847,336 A | 11/1974 | Morris et al. | 248/294 |
| 3,929,228 A | 12/1975 | Margolin et al. | 211/102 |
| 4,029,352 A | 6/1977 | Evans | 296/23 R |
| 4,261,550 A | 4/1981 | Gregory | 256/67 |
| 4,335,862 A | 6/1982 | Sherman | 248/289.1 |
| 4,720,116 A | 1/1988 | Williams et al. | 280/166 |
| 4,823,910 A | 4/1989 | Day | 182/84 |
| 4,976,455 A | 12/1990 | Brammer, Sr. et al. | 280/762 |
| 5,024,420 A | 6/1991 | Downing | 256/67 |
| 5,028,029 A | 7/1991 | Beck et al. | 248/479 |
| 5,076,547 A | 12/1991 | Osterholm | 256/67 |
| 5,078,276 A | 1/1992 | Rogge et al. | 211/18 |
| 5,116,025 A | 5/1992 | Kiniry | 256/67 |
| D374,581 S | 10/1996 | Kiniry | D6/501 |
| 6,375,146 B1 | 4/2002 | Painchaud | 248/534 |
| 6,425,572 B1 | 7/2002 | Lehr | 256/1 |
| 6,843,468 B1 * | 1/2005 | Marshall et al. | 256/65.16 |
| 2003/0029974 A1 | 2/2003 | Marshall et al. | 248/205.1 |

OTHER PUBLICATIONS

Lend-A-Hand Installation Instructions, dated Apr. 11, 1996, Stromberg Carlson Products, Inc.

\* cited by examiner

*Primary Examiner*—David P. Bryant
(74) *Attorney, Agent, or Firm*—Van Dyke, Gardner, Linn & Burkhart, LLP

(57) ABSTRACT

A bracket for pivotally mounting a handle adjacent to an opening of a vehicle includes a handle receiving portion adapted to receive an end of the handle, a pivot pin for pivotally mounting the end of the handle at the handle receiving portion, and at least one mounting hole or aperture. The handle receiving portion is configured to retain the end of the handle such that the handle is in an in use position or a stored position. The pivot pin extends downward from the handle receiving portion and includes a biasing member to bias the handle at either position. The mounting aperture is accessible for securing the bracket to a surface of the vehicle when the pivot pin and the handle are assembled to the bracket. The bracket and the handle thus may be mounted to the wall of the vehicle as a pre-assembled unit.

12 Claims, 2 Drawing Sheets

METHOD FOR INSTALLING A FOLDAWAY HAND RAIL TO A VEHICLE

CROSS REFERENCE TO RELATED APPLICATION

The present application claims priority of U.S. provisional application Ser. No. 60/404,093, filed Aug. 16, 2002, which is hereby incorporated herein by reference in its entirety.

FIELD OF THE INVENTION

The present invention relates generally to assist handles or rails for recreational vehicles and the like and, more particularly, to a foldaway assist handle or rail assembly which is mountable to a side of a recreational vehicle.

BACKGROUND OF THE INVENTION

Foldaway assist rails or handles are known and are mountable to a side of a recreational vehicle or the like via securing brackets to the vehicle with suitable fasteners. The handle or railing is foldable between a stored position, where the handle is positioned along a side of the vehicle, and an in use position, where the handle extends outwardly from the vehicle for a person to grasp the handle as they are entering or leaving the recreational vehicle. The handle is pivotally mounted to a pair of brackets via a pivot pin at each end of the handle. The brackets are mounted or installed at the side of the vehicle. However, in order to install the brackets to the vehicle, the handle assembly must be supplied as component parts, particularly, the handle and pivot pins must be separate from the brackets, in order to provide access to the mounting holes in the brackets for screwing, bolting or otherwise fastening or securing the brackets to the wall or side of the recreational vehicle. This is because the mounting holes are generally centered on the bracket and the pivot pin is also generally centered on the bracket, such that the pivot pin is aligned along the mounting holes and thus restricts or precludes access to the fasteners inserted through the mounting holes. The handle must then be assembled to the brackets after the brackets are installed at the vehicle. This not only increases the number of steps to mount the handle, but the person installing the handle assembly must make careful measurements to position the brackets at the appropriate location on the vehicle surface.

SUMMARY OF THE INVENTION

The present invention is intended to provide a folding or fold away assist rail or handle assembly that can be mounted to a vehicle in an assembled state, in order to ease installation of the brackets and handle assembly onto the targeted recreational vehicle or the like.

According to an aspect of the present invention, a bracket for pivotally mounting a handle or railing adjacent an opening of a vehicle includes a handle receiving portion, a pivot pin and at least one mounting hole or aperture. The handle receiving portion receives an end of the handle therein, while the pivot pin pivotally mounts the end of the handle at the handle receiving portion. The handle receiving portion is configured to retain the end of the handle such that the handle is in an in use position or a folded or storage position. The pivot pin includes a biasing member to bias the handle at either the in use position or the storage position relative to the handle receiving portion. The pivot pin extends downward from the handle receiving portion. The mounting apertures are accessible for securing the bracket to a surface of the vehicle with the pivot pin and handle assembled to the bracket. This may be accomplished by the mounting apertures being offset relative to the pivot pin.

In one form, a handle receiving portion for receiving a handle in its outward or in use position is offset toward one side from a centerline of the bracket, while the at least one mounting aperture is offset toward the other side from the centerline of the bracket, thereby providing clearance and access to the mounting apertures for installation of the bracket to the surface of the vehicle.

According to another aspect of the present invention, a method of attaching or mounting a handle or railing to a surface of a vehicle includes assembling the railing to at least one bracket, such that the railing is pivotally attached to the at least one bracket, and then mounting the at least one bracket to the side of the vehicle. The handle assembly, including the railing or handle and the at least one bracket, is thus mounted to the side of the vehicle as an assembled unit.

Therefore, the present invention provides a handle assembly having a mounting bracket for pivotally mounting a foldaway assist handrail or handle to a vehicle which does not require the assembly to be supplied as separate components and does not require disassembly of the handle assembly prior to installation of the brackets on the vehicle. The handle assembly, which includes the handle, brackets and pivot pins, may be preassembled and installed onto the wall or side of the vehicle as a unit, since the mounting holes are accessible even when the handle and pivot pins are assembled to the brackets.

These and other objects, advantages, features and purposes of this invention will become apparent upon review of the following specification in conjunction with drawings.

DESCRIPTION OF THE PREFERRED EMBODIMENTS

Figure 1:
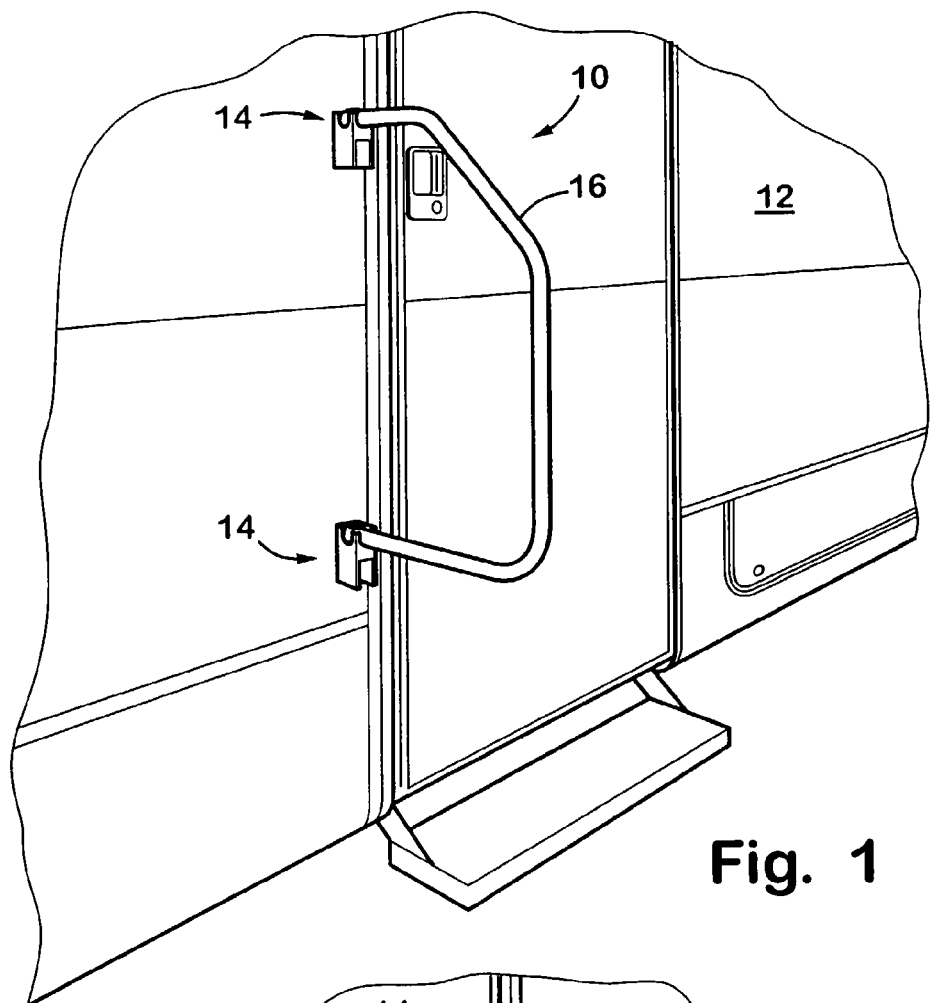
FIG. 1 is a perspective view of a handrail mounted to a bracket on a vehicle in accordance with the present invention, with the handrail in an in use position.
Figure 2:
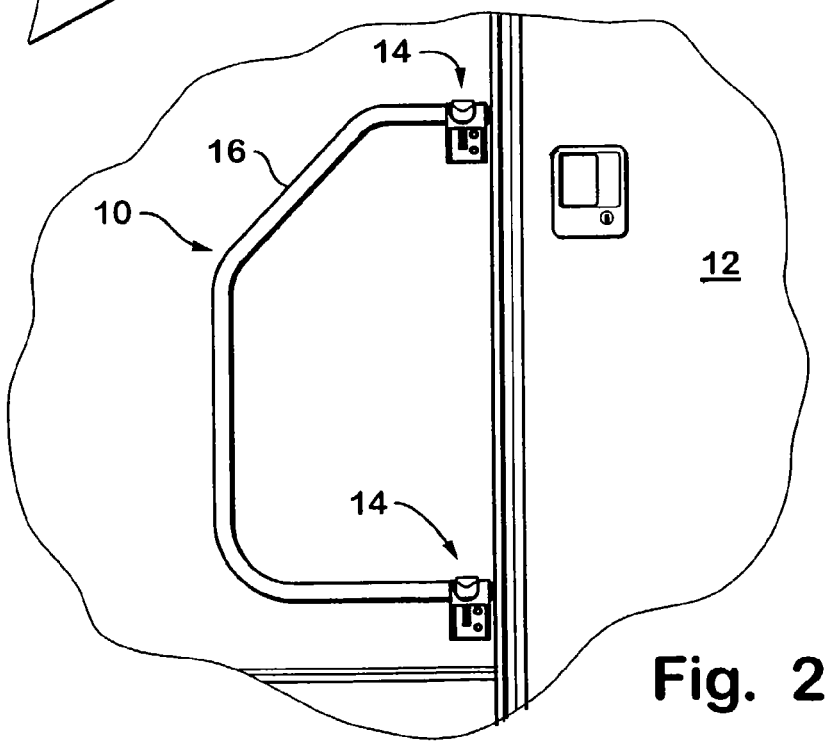
FIG. 2 is a perspective view of the handrail of FIG. 1, with the handrail in a stored position.

Referring now to the drawings and the illustrative embodiments depicted therein, a foldaway handrail or handle assembly 10 is mountable to a side or surface of a vehicle 12 (FIGS. 1 and 2) adjacent to a door or other opening in the vehicle. The handle assembly 10 includes a pair of brackets 14 and a handrail or handle 16 pivotally mounted at each end to the brackets 14. As can be seen in FIGS. 1 and 2, handle 16 is selectively pivotable between an in use position (FIG. 1), where the handle extends outwardly from the side of the vehicle, and a foldaway or stored position (FIG. 2), where the handle is folded along the side of the vehicle, as is known in the art. The brackets 14 are mountable to the side of the vehicle 12 with the handrail pivotally mounted to the brackets, such that the handrail assembly 10 is mountable to the vehicle as a pre-assembled unit.

Figure 3:
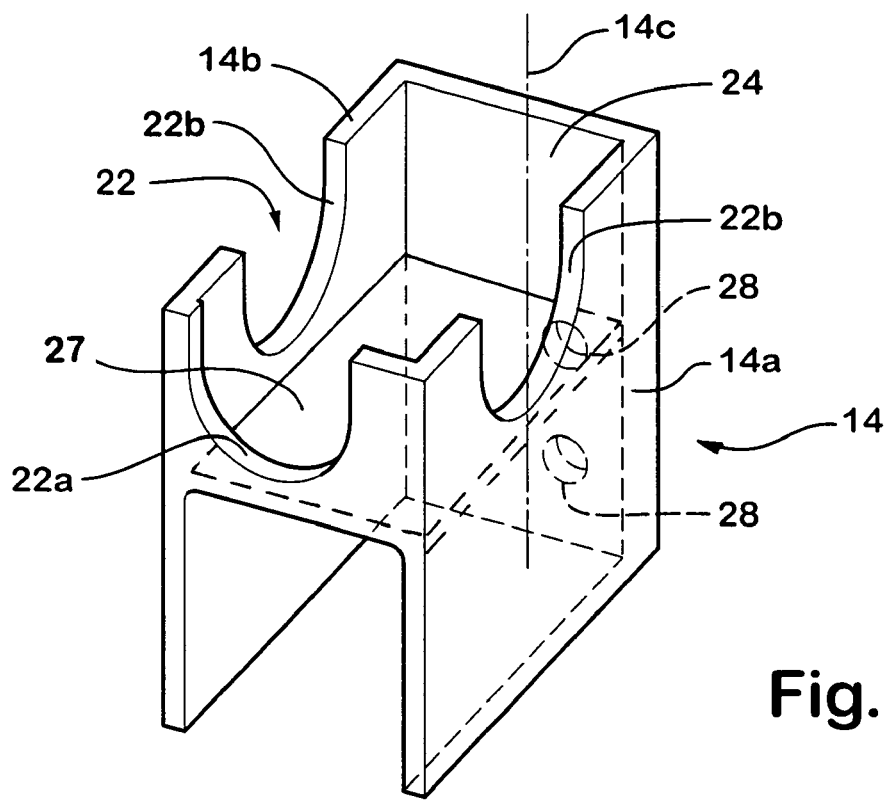
FIG. 3 is a perspective view of a bracket of the present invention for use with the handrail of FIGS. 1 and 2.

Handle 16 is pivotally mounted at each end to a respective bracket 14 via a pivot pin or bolt 18. The pivot pin 18 extends through the end of the handle and is retained at one end by a cap member or top cap 20 on an upper portion of the end of the handle. The top cap 20 may be curved to mate with the generally cylindrical shape of the handle to limit rotation of the top cap relative to the handle. The bracket 14 includes a handle receiving portion 22 at an upper end thereof and a mounting plate 24 along a rear surface or engaging surface of the bracket. The handle receiving portion 22 includes a U-shaped channel or receiving portion 22a, 22b for receiving the end of the handle in each of the two positions, as can be seen in FIG. 3. In the illustrated embodiment of FIG. 3, the U-shaped portion 22a receives the end of the handle 16 when the handle is in the in use position, while the U-shaped portion 22b receives the end of the handle 16 when the handle is in the storage or fold away position.

The pivot pin 18 extends from the top cap 20 through the handle 16 and through the handle receiving portion 22 to pivotally retain the end of the handle to the respective bracket 14. The pivot pin 18 includes a biasing member or spring 26 positioned below the handle receiving portion 22 which functions to bias or pull the pin 18 and handle end downward into the particular U-shaped portion 22a, 22b of the handle receiving portion 22. The pivot pin 18 is inserted through a floor portion or retaining plate or structure 27 (FIG. 3), and the biasing member 26 engages a lower portion of the plate or structure to retain the handle 16 at the bracket and to bias the handle 16 into the appropriate U-shaped portion 22a, 22b. Pivotal movement of the handle between the folded or storage position and the in use position is accomplished by lifting upward at the handle to pull the ends of the handle upward out of the U-shaped handle receiving portions of the brackets, and pivoting the handle 16 until the ends of the handle generally align with the other U-shaped handle receiving portions of the brackets. The handle then may be lowered down, such that the ends of the handle are lowered into the other U-shaped handle receiving portions and biased therein by the springs 26 of the respective brackets 14.

Figure 4:
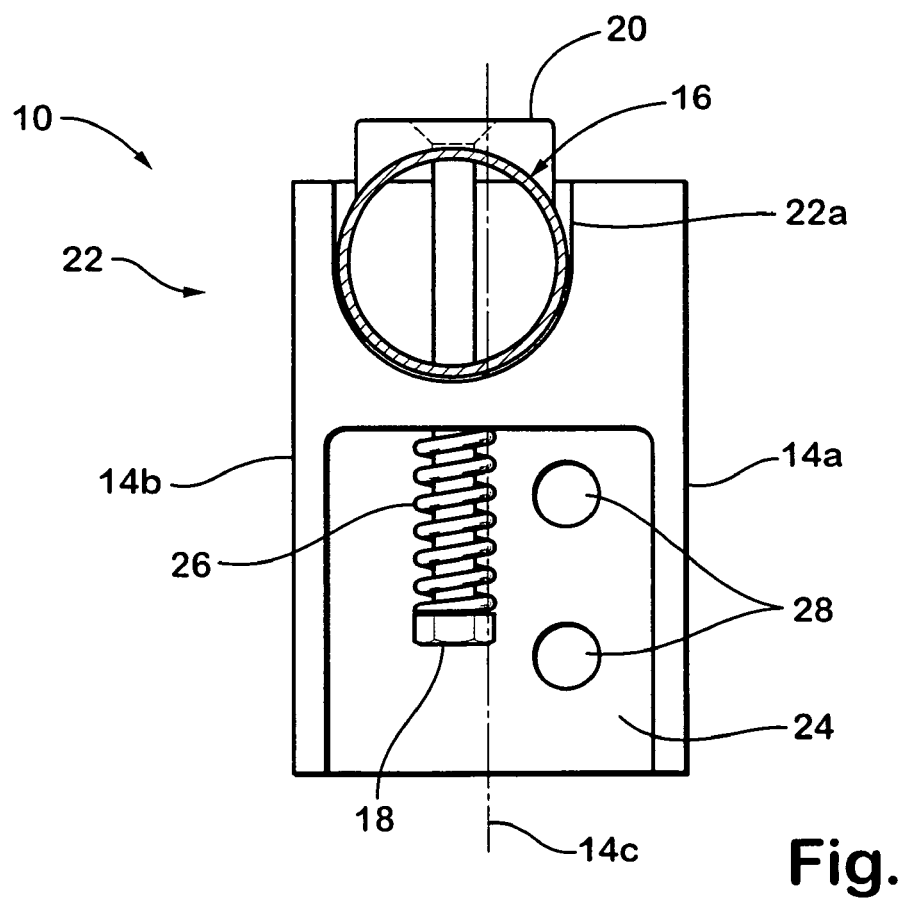
FIG. 4 is a side elevation of the bracket of FIG. 3.

As shown in FIG. 4, the pivot pin 18 and biasing member 26 extend downward from the handle receiving portion 22 and generally along the mounting plate 24 of the bracket 14. The mounting plate 24 includes one or more mounting holes or apertures 28 through the mounting plate for receiving suitable fasteners (not shown) therethrough. As can be seen in FIG. 4, the apertures 28 are positioned toward one side 14a of the bracket 14, so as not to align with the pivot pin 18. This provides easy access to the mounting holes to facilitate fastening or mounting the bracket to the vehicle with suitable fasteners without disassembly of the handle assembly or removal of the pivot pin from the bracket. In the illustrated embodiment, the mounting holes 28 are at least partially offset toward the one side 14a of the bracket 14 from a centerline 14c of the bracket 14, while the handle receiving portion 22a for holding the handle in its in use position is at least partially offset from the centerline 14c of the bracket 14 toward the other side 14b of the bracket, in order to provide clearance and access to the mounting holes 28, while minimizing the overall width of the bracket 14.

Therefore, the present invention provides a bracket for a foldaway handle assembly which may be easily mounted to a surface of a vehicle without requiring disassembly of the handle from the bracket prior to the installation. The handle assembly thus may be pre-assembled and installed to the vehicle as a single unit, such that further assembly of the handle to the brackets is not required after the brackets have been installed to the vehicle.

Changes and modifications in the specifically described embodiments can be carried out without departing from the principles of the present invention, which is intended to be limited only by the scope of the appended claims as interpreted according to the principles of patent law.

The embodiments of the invention in which an exclusive property right or privilege is claimed are defined as follows:

1. A method for installing a foldaway hand rail to a surface of a vehicle comprising:
    assembling a hand rail to at least one bracket, such that said hand rail is selectively positionable in first and second positions relative to said at least one bracket, said at least one bracket having a handle receiving portion and a pair of mounting apertures, said mounting apertures being laterally offset from said handle receiving portion;
    mounting said at least one bracket to the surface of the vehicle after said hand rail is assembled to said at least one bracket, said mounting apertures being generally vertically aligned when said bracket is mounted to the surface of the vehicle.

2. The method of claim 1, wherein said hand rail is selectively pivotable between said first and second positions.

3. The method of claim 2, wherein said at least one bracket comprises a pair of brackets.

4. The method of claim 3, wherein assembling said hand rail to said pair of brackets includes assembling said hand rail to said pair of brackets with a pivot pin extending through an end of said hand rail at each of said pair of brackets.

5. The method of claim 4, wherein mounting said brackets to the surface of the vehicle includes mounting each of said brackets to the surface of the vehicle with at least one fastener inserted through at least one mounting aperture in said bracket, said at least one mounting aperture being offset from said pivot pin.

6. The method of claim 1, wherein said receiving portion is offset toward one side of said at least one bracket from a centerline of said at least one bracket and said pair of mounting apertures are offset toward the other side of said at least one bracket from said centerline.

7. A method for installing a foldaway hand rail to a surface of a vehicle comprising:
    assembling a hand rail to at least one bracket, such that said hand rail is selectively positionable in first and second positions relative to said at least one bracket;
    mounting said at least one bracket to the surface of the vehicle after said hand rail is assembled to said at least one bracket and irrespective of the position of said hand rail relative to said at least one bracket.

8. The method of claim 7, wherein said hand rail is selectively pivotable between said first and second positions.

9. The method of claim 8, wherein said at least one bracket comprises a pair of brackets.

10. The method of claim 9, wherein assembling said hand rail to said pair of brackets includes assembling said hand rail to said pair of brackets with a pivot pin extending through an end of said hand rail at each of said pair of brackets.

11. The method of claim 10, wherein mounting said brackets to the surface of the vehicle includes mounting each of said brackets to the surface of the vehicle with at least one fastener inserted through at least one mounting aperture in said bracket, said at least one mounting aperture being offset from said pivot pin.

12. The method of claim 7, wherein said at least one bracket includes a receiving portion for receiving an end of said hand rail, said receiving portion being offset toward one side of said at least one bracket, said at least one bracket including at least one mounting aperture offset toward the other side of said at least one bracket.

* * * * *